W. P. NEWHALL.

NIGHT-BURNER.

No. 6,852.

Reissued Jan. 11, 1876.

Witnesses:
George Thom.
Courtney A. Cooper.

R. H. Gass
H. McManus } assignees.
By their attys
Charles E. Foster

UNITED STATES PATENT OFFICE.

WALTER P. NEWHALL, OF PEEKSKILL, N. Y., ASSIGNOR, BY MESNE ASSIGNMENTS, TO R. H. PLASS AND HENRY McMANUS, OF NEW YORK CITY.

IMPROVEMENT IN NIGHT-BURNERS.

Specification forming part of Letters Patent No. 45,513, dated December 20, 1864; reissue No. 6,852, dated January 11, 1876; application filed January 6, 1875.

*To all whom it may concern:*

Be it known that WALTER P. NEWHALL, of Peekskill, county of Westchester, State of New York, invented an Attachment for Coal-Oil-Lamp Burners, of which the following is a specification:

The object of this invention is to provide an ordinary lamp-burner with appliances whereby the flame may at any time be reduced to the size required for a night-light, and this object is effected by means of an adjustable cap or hood for covering a portion of the wick, as shown in the accompanying drawing, in which—

Figure 1:
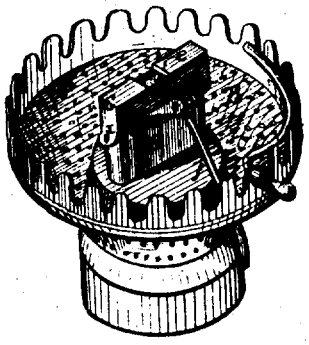
Figure 2:
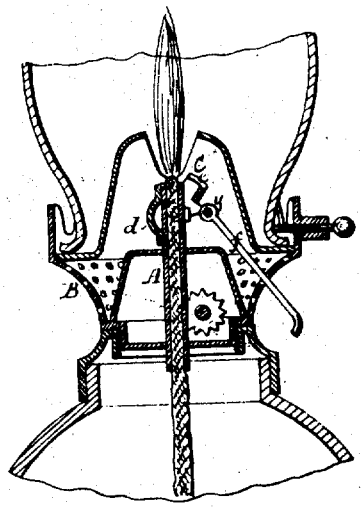

Figure 1 is a perspective view of a burner with the appliances for reducing the size of the flame; Fig. 2, a vertical central section, showing the parts in a different position; and Fig. 3, a detached perspective view of the device used in applying the invention to ordinary burners.

Similar letters of reference indicate corresponding parts in the several figures.

B represents the body of a coal-oil burner; A, the wick-tube, and C a hood so pivoted to pins *x x* that it may be turned to either of the positions shown in Figs. 1 and 2. A rod, *f*, jointed to the hood at *y*, and extending through an opening in the casing of the burner, affords a means of adjusting the hood without removing the dome.

The hood is of such a form that when it is in the position shown in Fig. 1 it will cover the greater portion of the wick; but when retracted it will expose the wick along its entire edge.

It will be seen that by manipulating the rod *f* to bring the hood over the end of the wick-tube, covering the greater portion of the wick, as shown in Fig. 1, the flame is reduced to a size suitable for a night-light. By withdrawing the hood from above the wick-tube the wick is fully exposed, and a flame of the usual size is obtained, the hood being supported at one side of the wick-tube in a position ready for instant adjustment above the wick when a night-flame is required.

Figure 3:
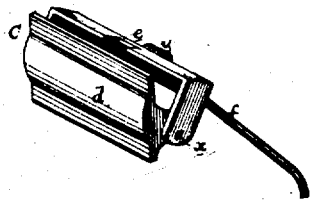

To render the device applicable to burners already in use the hood C is pivoted to a retainer, consisting of a plate, *d*, Fig. 3, having at the end lips, which carry the pins *x*, and extend around and embrace the wick-tube, securing thereto the plate and its appliances.

We claim—

1. The combination of a lamp-burner, an adjustable hood for covering a portion of the wick, and appliances whereby the hood may be adjusted without removing the dome of the burner, substantially as described.

2. The combination of a burner and a hood connected to the burner, and capable of being adjusted either to a position at one side of the wick-tube or to a position above, and covering a part of the wick, substantially as set forth.

3. A night-light attachment for coal-oil burners, consisting of a hood connected adjustably to a retainer, adapted to the wick-tube of a burner, as set forth.

In testimony whereof we have signed our names to this specification in the presence of two subscribing witnesses.

R. H. PLASS.
HENRY McMANUS.

Witnesses:
CHAS. W. PLASS,
GEO. A. SHEPARDSON.